(12) United States Patent
Nakata et al.

(10) Patent No.: US 7,038,848 B2
(45) Date of Patent: May 2, 2006

(54) CONFOCAL MICROSCOPE

(75) Inventors: Tatsuo Nakata, Hino (JP); Masahiro Aoki, Nishitama-gun (JP)

(73) Assignee: Olympus Corporation, Tokyo (JP)

( * ) Notice: Subject to any disclaimer, the term of this patent is extended or adjusted under 35 U.S.C. 154(b) by 75 days.

(21) Appl. No.: 10/741,522

(22) Filed: Dec. 18, 2003

(65) Prior Publication Data

US 2004/0150880 A1 Aug. 5, 2004

(30) Foreign Application Priority Data

Dec. 27, 2002 (JP) .............................. 2002-381492
Sep. 5, 2003 (JP) .............................. 2003-314402

(51) Int. Cl.
G02B 21/06 (2006.01)

(52) U.S. Cl. ...................... 359/386; 356/366

(58) Field of Classification Search ................ 359/368, 359/386, 371; 356/317, 318, 366, 369; 250/458.1, 250/459.1, 461.1, 461.2
See application file for complete search history.

(56) References Cited

U.S. PATENT DOCUMENTS 5,127,730 A 7/1992 Brelje et al.
6,856,391 B1 * 2/2005 Garab et al. ................ 356/366

FOREIGN PATENT DOCUMENTS

JP 8-254654 A 10/1996

OTHER PUBLICATIONS

Article entitled "Fluorescence of GFP Found Highly Polarized" from BIOPHOTONICS International, p. 10, May 2002.

* cited by examiner

Primary Examiner—Mark A. Robinson
Assistant Examiner—Alessandro Amari
(74) Attorney, Agent, or Firm—Frishauf, Holtz, Goodman & Chick, P.C.

(57) ABSTRACT

A confocal microscope comprises a light source emitting a polarized light beam, an objective lens irradiating the polarized light beam, which is deflected and scanned by the optical scanner, to the sample as an excitation light beam, a wavelength separator detecting a necessary wavelength band from a polarized fluorescence emitted from the sample which is excited by the polarized light beam, and a photodetector unit having a polarization property extractor extracting a fluorescence with a predetermined polarization property from the fluorescence detected with the wavelength separator, a wavelength selector selecting a wavelength of the fluorescence extracted by the polarization property extractor, and a photodetector detecting the fluorescence selected by the wavelength selector.

7 Claims, 4 Drawing Sheets

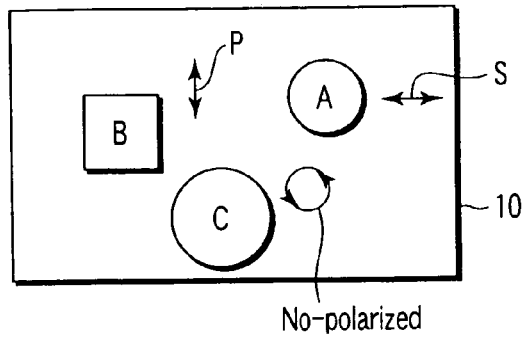
FIG. 5
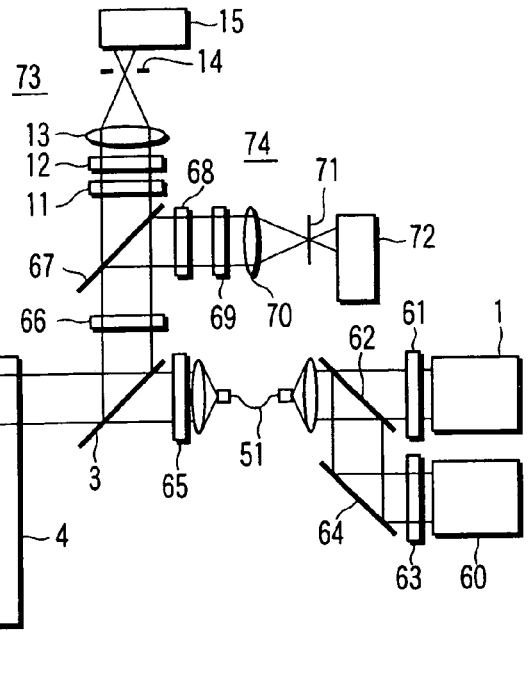
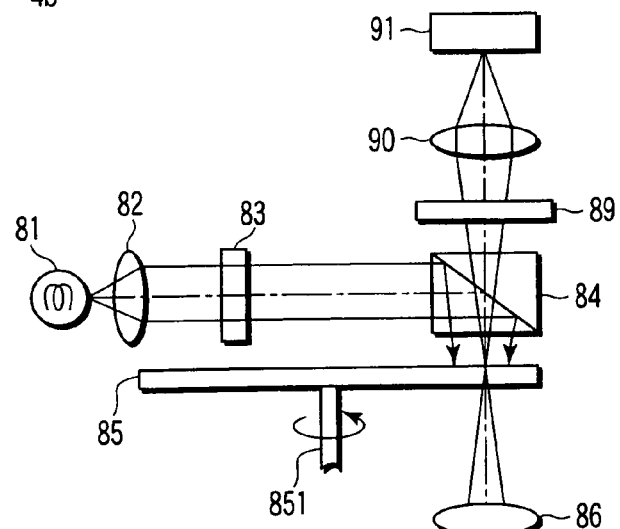
FIG. 6
FIG. 7

# CONFOCAL MICROSCOPE

CROSS-REFERENCE TO RELATED APPLICATIONS

This application is based upon and claims the benefit of priority from the prior Japanese Patent Applications No. 2002-381492, filed Dec. 27, 2002; and No. 2003-314402, filed Sep. 5, 2003, the entire contents of both of which are incorporated herein by reference.

BACKGROUND OF THE INVENTION

1. Field of the Invention

The present invention relates to a confocal microscope which excites a sample labeled with a fluorescence dyestuff and a fluorescent protein by use of an excitation wavelength, and detects a fluorescence emitted from the sample.

2. Description of the Related Art

Heretofore, as a confocal microscope, a multi-color confocal microscope in which a multi-wavelength fluorescence detection system is employed has been known (e.g., see U.S. Pat. No. 5,127,730).

The multi-color confocal microscope irradiates a sample having positions differently dyed with two or more fluorescent colorants with laser beams having wavelengths corresponding to the respective fluorescent colorants, and then detects fluorescent wavelengths, at which excitation occurs to generate the fluorescence, through wavelength separating means such as a dichroic mirror for these fluorescent wavelengths.

A confocal microscope capable of estimating a polarizing direction of the fluorescence dyestuff has also been known. For example, in the confocal microscope disclosed in Jpn. Pat. Appln. KOKAI Publication No. 8-254654, a sample is irradiated with laser beams emitted from a laser light source through an objective lens, and then through the objective lens, the fluorescence emitted from the sample is branched into two optical paths by the dichroic mirror. Afterward, the branched beams are passed through polarizers which cross with each other at right angles, to obtain two images in accordance with the polarization of the fluorescence dyestuff.

In recent years, for example, when a target protein of living cells is labeled with a fluorescence to observe distribution or movement thereof, a fluorescent protein such as GFP (green fluorescent protein) has often been utilized as a marker tracer.

A sample labeled with such GFP has polarization properties as described in BIOPHOTONICS International May, 2002, p. 10. Thus, by detecting the fluorescence polarization of the sample using a fluorescent protein such as GFP, it becomes possible to analyze molecular movement of the protein and a fluorescent life. Moreover, a molecular structure of the fluorescent protein changes by light stimulation, chemical reaction, electrical stimulation, pH and temperature variation or the like, so that the polarization properties change. Therefore, the analysis of the polarization properties of the fluorescent protein enables the analysis of a function of the protein.

Additionally, in the U.S. Pat. No. 5,127,730, only a general detecting method of a multi-wavelength fluorescence is disclosed, and the detection of a fluorescence having polarized components is not described. Moreover, in Jpn. Pat. Appln. KOKAI Publication No. 8-254654, it is described that two images are acquired in accordance with polarization of a fluorescence dyestuff by the fluorescence from the sample passed through the polarizers which cross with each other at right angles, but only the confocal microscope which emits a wavelength light to generate the fluorescence is described. Moreover, an excitation method for obtaining the fluorescence having the polarized components with the use of the fluorescent proteins such as GFP as the fluorescence label is not described in the Jpn. Pat. Appln. KOKAI Publication No. 8-254654.

BRIEF SUMMARY OF THE INVENTION

A confocal microscope according to the first aspect of the present invention is characterized by comprising: a light source emitting a polarized light beam; an objective lens irradiating the polarized light beam, which is deflected and scanned by the optical scanner, to the sample as an excitation light beam; a wavelength separator detecting a necessary wavelength band from a polarized fluorescence emitted from the sample which is excited by the polarized light beam; and a photodetector unit having a polarization property extractor extracting a fluorescence with a predetermined polarization property from the fluorescence detected with the wavelength separator, a wavelength selector selecting a wavelength of the fluorescence extracted by the polarization property extractor, and a photodetector detecting the fluorescence selected by the wavelength selector.

A confocal microscope according to the second aspect of the present invention is characterized by comprising: a light source emitting a polarized light beam; an objective lens condensing the polarized light beam on a sample; a rotational disk having a plurality of pinholes or slits and leading the polarized light beam from the light source to the objective lens, a fluorescence image emitted from the sample being projected on the rotational disk through the objective lens; a wavelength separator detecting a necessary wavelength band from an image passing the rotational disk; a polarization property extractor extracting a fluorescence with a predetermined polarization property from the fluorescence detected with the wavelength separator; and an imaging unit imaging the fluorescence extracted by the polarization property extractor.

A confocal microscope according to the third aspect of the present invention is characterized by comprising: a light source emitting a beam; a polarizer polarizing the light beam; an optical scanner deflecting and scanning the polarized light beam; an objective lens irradiating the polarized light beam, which is deflected and scanned by the optical scanner, to the sample as an excitation light beam; a wavelength separator detecting a necessary wavelength band from a polarized fluorescence emitted from the sample which is excited by the polarized light beam; and a photodetector unit having a polarization property extractor extracting a fluorescence with a predetermined polarization property from the fluorescence detected with the wavelength separator, a wavelength selector selecting a wavelength of the fluorescence extracted by the polarization property extractor, and a photodetector detecting the fluorescence selected by the wavelength selector.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a diagram showing the schematic configuration of the second embodiment;

FIG. 6 is a diagram showing the schematic configuration of the modification of the second embodiment;

FIG. 7 is a diagram showing the schematic configuration of a third embodiment of the present invention.

DETAILED DESCRIPTION OF THE INVENTION

Embodiments of the present invention will hereinafter be described with reference to the drawings.

(First Embodiment)

Figures 1, 2:
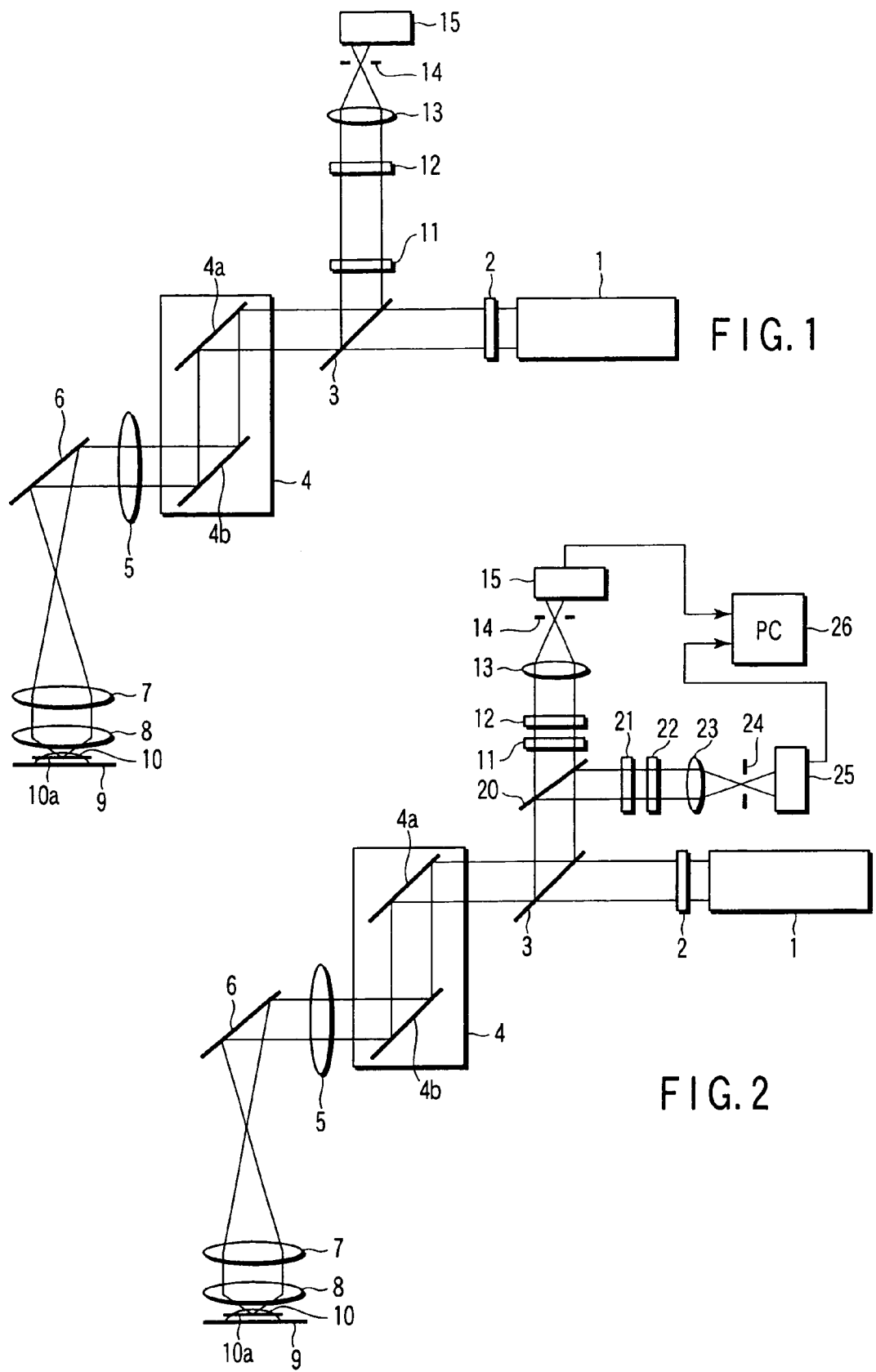
FIG. 1 is a diagram showing a schematic configuration of a first embodiment of the present invention.
FIG. 2 is a diagram showing the schematic configuration of Modification 1 of the first embodiment.

FIG. 1 shows a schematic configuration of a confocal laser scanning microscope to which the present invention is applied.

In FIG. 1, a laser light source 1 emits a pulsed laser beam having polarized components.

A polarizer 2, a dichroic mirror 3 used as wavelength dividing means, and a scanning optical unit 4 use as light scanning means are arranged on an optical path of the laser beam outputted from the laser light source 1.

The polarizer 2 is used to improve and optimize polarization properties (extinction ratio) of the laser light source 1, and the laser light source 1 and the polarizer 2 constitute light source means which have polarization properties. The dichroic mirror 3 has properties for detecting a necessary wavelength band, transmits an incident laser beam from the laser light source 1, and reflects (detects) a fluorescence from the scanning optical unit 4. The scanning optical unit 4 includes scanning mirrors 4a, 4b, and the scanning mirrors 4a, 4b deflect the laser beam.

A relay lens 5 and a mirror 6 are arranged on the optical path of the laser beam deflected by the scanning optical unit 4. An image formation lens 7 and an objective lens 8 are arranged on a reflected optical path of the mirror 6.

A sample 10 laid on a stage 9 is irradiated with the laser beam reflected by the mirror 6 and passed through the image formation lens 7. The light with which a section 10a of the sample 10 is scanned in a predetermined range on the section 10a by movement. of the scanning mirrors 4a, 4b.

Fluorescent proteins such as GFP are used as fluorescence labels to the sample 10. The sample 10 is excited by the laser beam focused on a focal position and having polarized components to absorb the light in a polarizing direction in a transition moment of fluorescence molecules which agrees with the polarizing direction, and is brought into an excited state. In this case, the fluorescence deactivated from the excited state also forms a polarized light which agrees with the transition moment.

Accordingly, the fluorescence (hereinafter referred to as a polarized fluorescence) having the polarized components is generated from the sample 10. This polarized fluorescence is collected on the objective lens 8, passed through the image formation lens 7, and incident upon the dichroic mirror 3 through the mirror 6, relay lens 5, and scanning optical unit 4.

A polarizer 11 which is use as polarization property extraction means constituting photodetection means, a barrier filter 12 which use as is wavelength selection means, a confocal lens 13, a confocal pinhole 14, and a photomultiplier 15 which is use as a photodetection unit, are arranged on a reflected optical path deflected by 90 degrees by the dichroic mirror 3.

The polarizer 11 extracts the polarized fluorescence which has predetermined polarization properties. The barrier filter 12 selects a wavelength of the polarized fluorescence. The image of the polarized fluorescence selected from the barrier filter 12 is formed on a confocal pinhole 14 plane through the confocal lens 13. The polarized fluorescence passed through the confocal pinhole 14 is detected by the photomultiplier 15.

In this case, the same effect is obtained, even when the polarizer 11 is disposed after the confocal lens 13 and confocal pinhole 14. As the polarizer 11, a polarized beam splitter (PBS), ½ wavelength plate, polarizing rotator, liquid crystal shutter, Pockel cell, and the like may be used as long as the polarizing direction can be detected. Here, with the PBS, the polarized fluorescence can be split into a P polarized light and S polarized light. With the ½ wavelength plate, the polarizing direction can be changed. Therefore, when an AO device having the same function as that of the barrier filter 12 is used, the light is inserted in accordance with the polarizing direction of AO, and it is possible to select the wavelength by the AO.

Next, an operation of an embodiment constituted in this manner will be described.

When the laser beam having the polarized components is emitted from the laser light source 1, the laser light polarization properties are optimized by the polarizer 2, transmitted through the dichroic mirror 3, and incident upon the scanning optical unit 4. The laser beam incident upon the scanning optical unit 4 is deflected by the scanning mirrors 4a, 4b.

The laser beam deflected by the scanning optical unit 4 is incident upon the image formation lens 7 through the relay lens 5 and mirror 6. The laser beam passed through the image formation lens 7 is focused on the section 10a of the sample 10 laid on the stage 9.

The sample 10 is excited by the polarized laser beam focused on the focal position to absorb the light in the polarizing direction in the transition moment of the fluorescence molecules which agrees with the polarizing direction, and is brought into the excited state. In this case, the fluorescence deactivated from the excited state also forms the polarized light which agrees with the transition moment.

The polarized fluorescence emitted from the sample 10 is incident upon the dichroic mirror 3 through the objective lens 8, image formation lens 7, mirror 6, relay lens 5, and scanning optical unit 4 in a direction reverse to the previous optical path.

The polarized fluorescence deflected by the dichroic mirror 3 by 90 degrees is incident upon the polarizer 11. The polarizer 11 extracts the fluorescence having predetermined polarization properties to guide the fluorescence into the barrier filter 12. The barrier filter 12 selects only the predetermined wavelength of the polarized fluorescence, and forms the image on the confocal pinhole 14 plane through the confocal lens 13. The polarized fluorescence passed through the confocal pinhole 14 is incident upon the photomultiplier 15. The photomultiplier 15 detects luminance of the incident polarized fluorescence, and converts it into an electric signal to output polarized fluorescence confocal image data.

Therefore, in this case, when the sample 10 labeled with the fluorescent proteins such as GFP is irradiated with the laser beam having the polarized components as an excited light, the sample 10 can securely be excited.

Moreover, the polarized fluorescence generated from the sample 10 by the excitation is detected via the dichroic mirror 3 which is used as wavelength dividing means, the polarizer 11 which is used as the polarization property extraction means, and the barrier filter 12 which is used as wavelength selection means. Accordingly, molecular movement of the protein and a fluorescent life concerning the polarized components can be analyzed from data of the polarized fluorescence. In this case, a molecular structure of the fluorescent protein changes by light stimulation, chemical reaction, electrical stimulation, pH and temperature variation or the like, so that polarization properties change. Therefore, the analysis of the polarization properties of the fluorescent protein enables the analysis of various functions of the protein.

Furthermore, to analyze the fluorescent proteins such as GFP, a specific portion in the cell is sometimes labeled. However, when the polarized components differ with a thickness direction of the sample in this manner, the polarized components of a portion other than a portion to be detected are synthesized in a general microscope, and it is difficult to detect the polarized components of the portion. Additionally, in the embodiment, since the specific portion of a sample in the thickness direction can be detected by a sectioning effect of the confocal microscope, it is possible to securely obtain information of the specific portion in the cell in the thickness direction.

It is to be noted that with the use of an IR pulse laser as the laser light source 1, a polarized fluorescence image can be acquired by two-photon absorption. Since a two-photon absorption phenomenon occurs only in an image formation position in this case, the confocal pinhole 14 is conceptually unnecessary. The dichroic mirror 3 for use in this case has short-wavelength reflection properties that the IR laser is transmitted, and a visible polarized fluorescence is reflected and guided on the side of the photomultiplier 15.

(Modification 1)

An example of detection of the polarized fluorescence of the sample 10 has been described in the first embodiment, but it is also possible to measure the fluorescent life. In FIG. 2, the same components as those of FIG. 1 are denoted with the same reference numerals.

In this case, a half mirror 20 is inserted as light dividing means in the reflected optical path of the dichroic mirror 3. Moreover, the above-described polarizer 11, barrier filter 12, confocal lens 13, confocal pinhole 14, and photomultiplier 15 are arranged in a transmission optical path of the half mirror 20, and a polarizer 21, barrier filter 22, confocal lens 23, confocal pinhole 24, and photomultiplier 25 are arranged in the reflected optical path.

Here, assuming that the polarizer 11 and the polarizer 21 extract s-polarized components and p-polarized components of polarized fluorescence, respectively, fluorescent intensities of the s-polarized and p-polarized components extracted by the polarizers 11, 21 are detected by the is photomultipliers 15, 25.

Moreover, the photomultipliers 15, 25 are connected to a personal computer (PC) 26 which is calculation means. The PC 26 calculates an anisotropy ratio r(t) based on the fluorescent intensities of the s-polarized and p-polarized components detected by the photomultipliers 15, 25 by the following equation.

$$r(t)=[Is(t)-Ip(t)]/[Is(t)+2 \cdot Ip(t)] \quad (1),$$

where Is(t) denotes the fluorescent intensity of the s-polarized component, and Ip(t) denotes the fluorescent intensity of the p-polarized component.

The anisotropy ratio r(t) has a certain relation with rotation relaxation time and oscillation diffusion speed, and various dynamic properties of molecules can be known by the anisotropy ratio r(t). When Is(t)+Ip(t) is further obtained, the fluorescent life of the fluorescent protein can also be obtained from an attenuation curve regardless of a rotational movement. The dynamic properties and fluorescent life of the molecules and fluorescent protein also change depending on various surrounding conditions. Therefore, these information can simultaneously be measured, the information can be an important bioscientific analysis tool.

(Modification 2)

Figure 3:
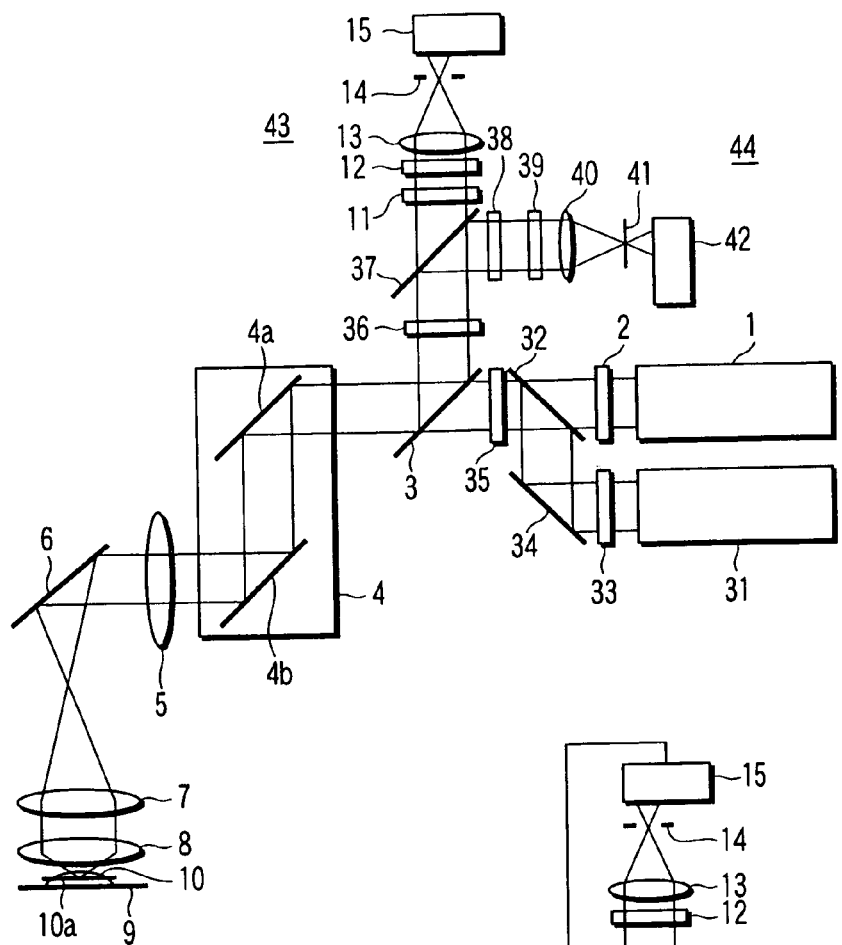
FIG. 3 is a diagram showing the schematic configuration of Modification 2 of the first embodiment.

An example in which one laser light source and one photodetection section are arranged has been described in the first embodiment but, as shown in FIG. 3, two laser light sources and two photodetection sections may also be disposed. In FIG. 3, the same components as those of FIG. 1 are denoted with the same reference numerals.

In Modification 2, a laser light source 31 is disposed together with the laser light source 1. The laser light source 31 emits the laser beam having the polarized components different from the laser light source 1 in wavelength.

A synthesis mirror 32 is disposed via the polarizer 2 on the optical path of the laser beam outputted from the laser light source 1. A mirror 34 is disposed via a polarizer 33 on the optical path of the laser beam outputted from the laser light source 31. The laser beam reflected by the mirror 34 is incident upon the synthesis mirror 32.

The synthesis mirror 32 can be replaced with the dichroic mirror having wavelength properties or the polarized beam splitter (PBS) having polarization properties. Acoustic optical devices such as AOTF can also be used to synthesize the light.

The dichroic mirror 3 and scanning optical unit 4 are arranged via a polarizer 35 on the optical path of the laser beam synthesized by the synthesis mirror 32.

On the other hand, a half mirror 37 is inserted as light dividing means via a polarizer 36 on the reflected optical path of the dichroic mirror 3. Moreover, the polarizer 11, barrier filter 12, confocal lens 13, confocal pinhole 14, and photomultiplier 15 are arranged as first photodetection means on the transmission optical path of the half mirror 37, and a polarizer 38, barrier filter 39, confocal lens 40, confocal pinhole 41, and photomultiplier 42 are arranged on the reflected optical path.

When a plurality of laser light sources 1, 31 and photodetection means 43, 44 are prepared in this manner, a sample of a multi-wavelength fluorescence or a sample partially different in the polarizing direction can be handled.

Here, to handle the sample 10 of the multi-wavelength fluorescence, the wavelengths of the laser light sources 1, 31 are set for the fluorescence wavelengths, and the wavelength is selected and set by the barrier filters 12, 39 which are wavelength selection means for each of the photodetection means 43, 44. To handle the sample partially different in the polarizing direction, the laser light sources 1, 31 different in the polarization properties are prepared, and the polarizing directions of the laser light sources 1, 31 may be selected for each of portions having different polarizing directions on the sample.

It is to be noted that in the modification, an example in which two laser light sources and two photodetection means are arranged has been described, and two or more laser light sources and photodetection means may also be disposed.

(Second Embodiment)

Next, a second embodiment of the present invention will be described. The same components as those of FIG. 1 are denoted with the same reference numerals.

Figure 4:
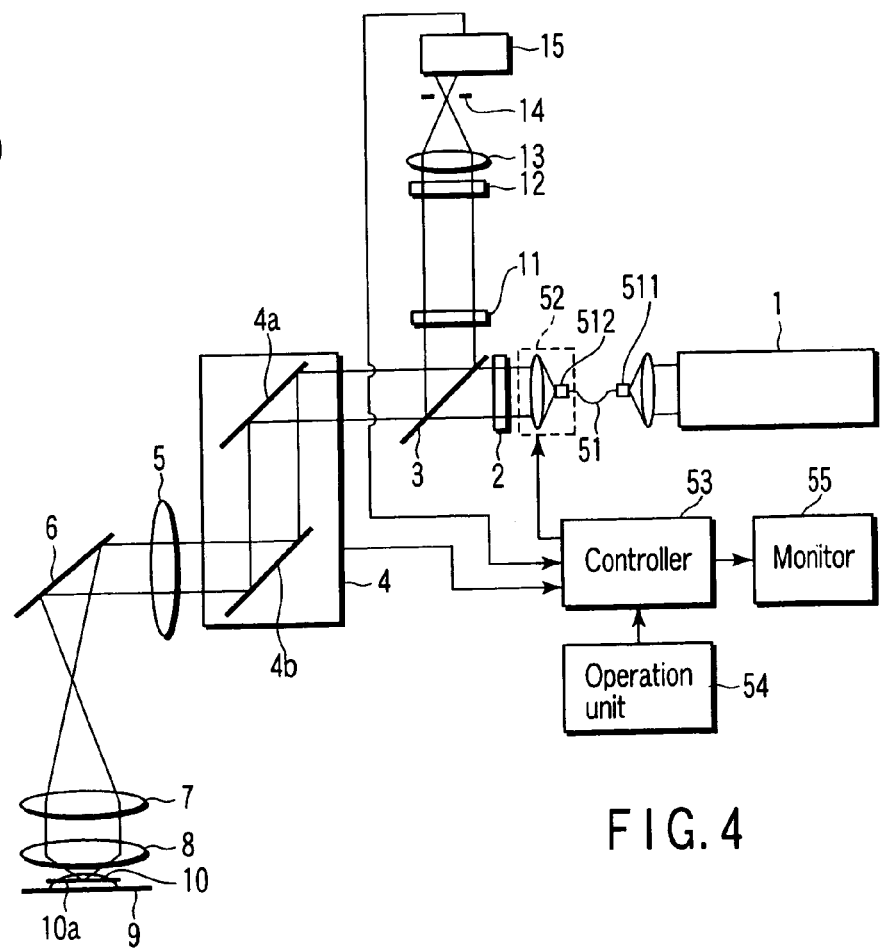
FIG. 4 is a diagram showing the schematic configuration of a second embodiment of the present invention.

FIG. 4 is a diagram showing the schematic configuration of the second embodiment. The same components as those of FIG. 1 are denoted with the same reference numerals.

In the second embodiment, an input end 511 of an optical fiber 51 is disposed on the optical path of the laser beam outputted from the laser light source 1. The optical fiber 51 transmits the laser beam having the polarized components from the laser light source 1. For example, a polarized wave plane storage fiber is preferably used as the optical fiber 51.

A rotating mechanism 52 is disposed as polarizing direction changing means in an output end 512 of the optical fiber 51. The rotating mechanism 52 is capable of rotating the output end 512 of the optical fiber 51, and the polarizing direction of the laser beam is freely changed in accordance with a rotational angle of the output end 512. That is, the rotating mechanism 52 changes the polarizing direction of the laser beam in accordance with the polarizing direction of the sample 10. Accordingly, when the rotating mechanism 52 is rotated by 90 degrees, the data of the polarized fluorescence by the excitation of the s-polarized and p-polarized components can selectively be acquired.

The polarizer 2 is disposed on the front surface of the rotating mechanism 52. This polarizer 2 can be rotated in accordance with the rotation of the rotating mechanism 52, and the polarizing direction is the same as that of the light emitted from the rotating mechanism 52.

The rotating mechanism 52 is connected to a controller 53 which is use as control means. The controller 53 is connected to the scanning optical unit 4 and photomultiplier 15, and is further connected to an operation unit 54 and monitor 55.

The controller 53 rotates/controls the rotating mechanism 52 by the operation of the operation unit 54, and the polarizing direction of the laser beam can arbitrarily be set. The controller 53 includes means (not shown) for detecting each portion on the sample 10 based on scanning information of the scanning optical unit 4 in accordance with the movement of the scanning mirrors 4a, 4b on the sample 10, and the rotating mechanism 52 is rotated/controlled by detected information here. Moreover, the image information of each portion on the sample 10 is displayed on the monitor 55 by the data of the photomultiplier 15 acquired in this manner.

In this case, the rotating mechanism 52 is rotated by the controller 53 in accordance with the polarizing direction of the sample 10, and the polarizing direction of the laser beam can be changed to selectively acquire the information in accordance with the polarizing direction by the excitation of the s-polarized and p-polarized components on the sample 10.

Moreover, when it is known that the characteristics of the polarizing direction etc. on the sample 10 differs with each portion, for example, as shown in A (s-polarized), B (p-polarized), C (no-polarized) in FIG. 5, the rotating mechanism 52 is rotated based on the scanning information of the scanning optical unit 4 on the sample 10 in accordance with the movement of the scanning mirrors 4a, 4b, that is, in accordance with each portion of A, B, C on the sample 10 to change the polarizing direction of the laser beam. Accordingly, image information of each portion on the sample 10 can be displayed on the monitor 55 (FIG. 5).

Furthermore, when the optical fiber 51 is used to introduce the laser beam outputted from the laser light source 1 into the rotating mechanism 52 here, a rotating portion of the rotating mechanism 52 can be compact. In this case, when the light having different wavelength and the laser beam having different polarizing direction are synthesized and introduced on the side of the input end 511 of the optical fiber 51, the polarizing directions of a large number of laser beams can be changed with one rotating mechanism 52.

It is to be noted that in the second embodiment, in a method of changing the polarizing direction of the laser beam, a mechanical configuration such as the rotating mechanism 52 has been used, but another method may also be used as long as the polarizing direction can be changed. For example, a method of using an optical polarizing rotator is used. Alternatively, a laser for random polarization is used in the light source, and a ¼ wavelength plate may also be combined with the polarizer to extract and use arbitrary polarized components from the random light. In this case, a ½ wavelength plate may also be combined to change the polarization to p-polarization and s-polarization. Furthermore, the whole laser light source 1 may be rotated around an optical axis to change the polarizing direction of the laser beam.

(Modification)

In the second embodiment, an example in which one laser light source and one photodetection means are disposed has been described. Two laser light sources and two photodetection means may also be disposed as shown in FIG. 6 in which the same components as those of FIG. 4 are denoted with the same reference numerals.

In this case, a laser light source 60 is disposed together with the laser light source 1. The laser light source 60 emitting the laser beam having the polarized components in the same manner as in the laser light source 1 is used.

A synthesis mirror 62 is disposed via an optical polarizing rotator 61 on the optical path of the laser beam outputted from the laser light source 1. A mirror 64 is disposed via an optical polarizing rotator 63 on the optical path of the laser beam outputted from the laser light source 60. Here, the optical polarizing rotators 61, 63 are capable of arbitrarily setting the polarizing direction of the laser beam of the laser light sources 1, 60.

The laser beam reflected by the mirror 64 is incident upon the synthesis mirror 62. The synthesis mirror 62 can be replaced with the dichroic mirror having the wavelength properties or the polarized beam splitter (PBS) having the polarization properties. The acoustic optical devices such as AOTF can also be used to synthesize the light.

The input end 511 of the optical fiber 51 is disposed on the optical path of the laser beam synthesized by the synthesis mirror 62. The dichroic mirror 3 and scanning optical unit 4 are arranged via a polarizer 65 on the side of the output end 512 of the optical fiber 51.

On the other hand, a half mirror 67 is inserted as the light dividing means via a polarizer 66 on the reflected optical path of the dichroic mirror 3. The polarizer 11, barrier filter 12, confocal lens 13, confocal pinhole 14, and photomultiplier 15 are arranged as first photodetection means 73 in the transmission optical path of the half mirror 67. A polarizer 68, barrier filter 69, confocal lens 70, confocal pinhole 71, and photomultiplier 72 are arranged as second photodetection means 74 in the reflected optical path.

In this manner, the polarizing rotators 61, 63 may be operated with respect to the laser light sources 1, 60 to individually set the polarizing directions of the laser beam. That is, the polarizing rotator 61 may be operated to s-polarize the laser beam of the laser light source 1, the polarizing rotator 63 may be operated to p-polarize the laser beam of the laser light source 60, and the s-polarized and p-polarized laser beams may be synthesized and given as an excited light to the sample 10. Needless to say, the polarizing rotator 61 may be operated to p-polarize the laser beam of the laser light source 1, and the polarizing rotator 63 may also be operated to s-polarize the laser light of the laser light source 60.

Accordingly, even when the polarizing direction differs with each portion of the sample 10, the polarizing direction of the laser beam of the laser light sources 1, 60 can be set in an optimum state in accordance with the difference of the polarizing direction. In this case, the polarized 65 is removed or synchronously rotated.

Moreover, two laser light sources 1, 60 can be used/applied in a case where the wavelength of the laser beam differs in order to excite the different fluorescence wavelength and in a case where the wavelength of the laser beam is the same and the polarizing direction differs. When the wavelength of the laser beam differs, the laser beam can be selected and used with respect to the fluorescence wavelength of the sample 10 to handle a multi-wavelength fluorescence sample. When the wavelength of the laser beam is the same and the polarizing direction is different, by changing the polarizing direction with the polarizing rotators 61, 63, and the sample 10 different in the polarization properties can be handled for each fluorescence wavelength.

It is to be noted that an example in which two laser light sources and two photodetection means are arranged has been described above, but two or more laser light sources and photodetection means may also be arranged.

(Third Embodiment)

A third embodiment of the present invention will next be described.

In the first and second embodiments, the confocal laser scanning microscope in which the laser beam is focused on a spot and scanned has been described. The confocal microscope has another system, and it is possible to obtain the similar effect.

FIG. 7 shows the schematic configuration of the third embodiment.

In FIG. 7, the light emitted from a light source 81 is formed into a parallel light by a collimator lens 82, and is incident upon a polarizer 83. The polarizer 83 converts the light of the light source 81 to the light which has the polarization properties. The polarizer 83 constitutes light source means which has the polarization properties together with the light source 81.

The light incident upon the polarizer 83 is converted to the light which has the polarization properties, and the light having an excited wavelength width is selected by a wavelength separator 84. Here, the dichroic mirror, AOM, and the like are used in the wavelength separator 84.

The light selected by the wavelength separator 84 is passed through a rotational disk 85, and is incident upon a focal position on a sample 88 surface as an excited light via an image formation lens 86 and objective lens 87.

The rotational disk 85 has a function of regulating the light with a pinhole or a slit etc. having an airy diameter of the objective lens 87 or the airy diameter×about 0.5. The rotational disk 85 is disposed on a focal plane which is a position optically conjugated with the objective lens 87, and is connected to a shaft of a motor (not shown) via a rotation shaft 851 to rotate at a certain rotation speed.

The sample 88 generates the fluorescence having the polarized components by the excited light, and projects a fluorescence image on the rotational disk 85 by the image formation lens 86 via the objective lens 87. A focused portion of the projected image is passed through the pinhole or slit to obtain a confocal effect. The portion is further passed through the wavelength separator 84, and the polarized components are selected by a polarizer 89, and thereafter imaged by a CCD camera 91 which is imaging means via an image formation lens 90.

It is possible to obtain the same effect as that of the above-described confocal laser scanning microscope by the confocal microscope constituted in this manner. In the confocal microscope, a white light source, LED, laser light source, and the like may be used in the light source 81. When the laser light source is used, the laser light source having the polarized components may be used to omit the polarizer 83.

(Fourth Embodiment)

Next, a fourth embodiment of the present invention will be described.

Figure 8:
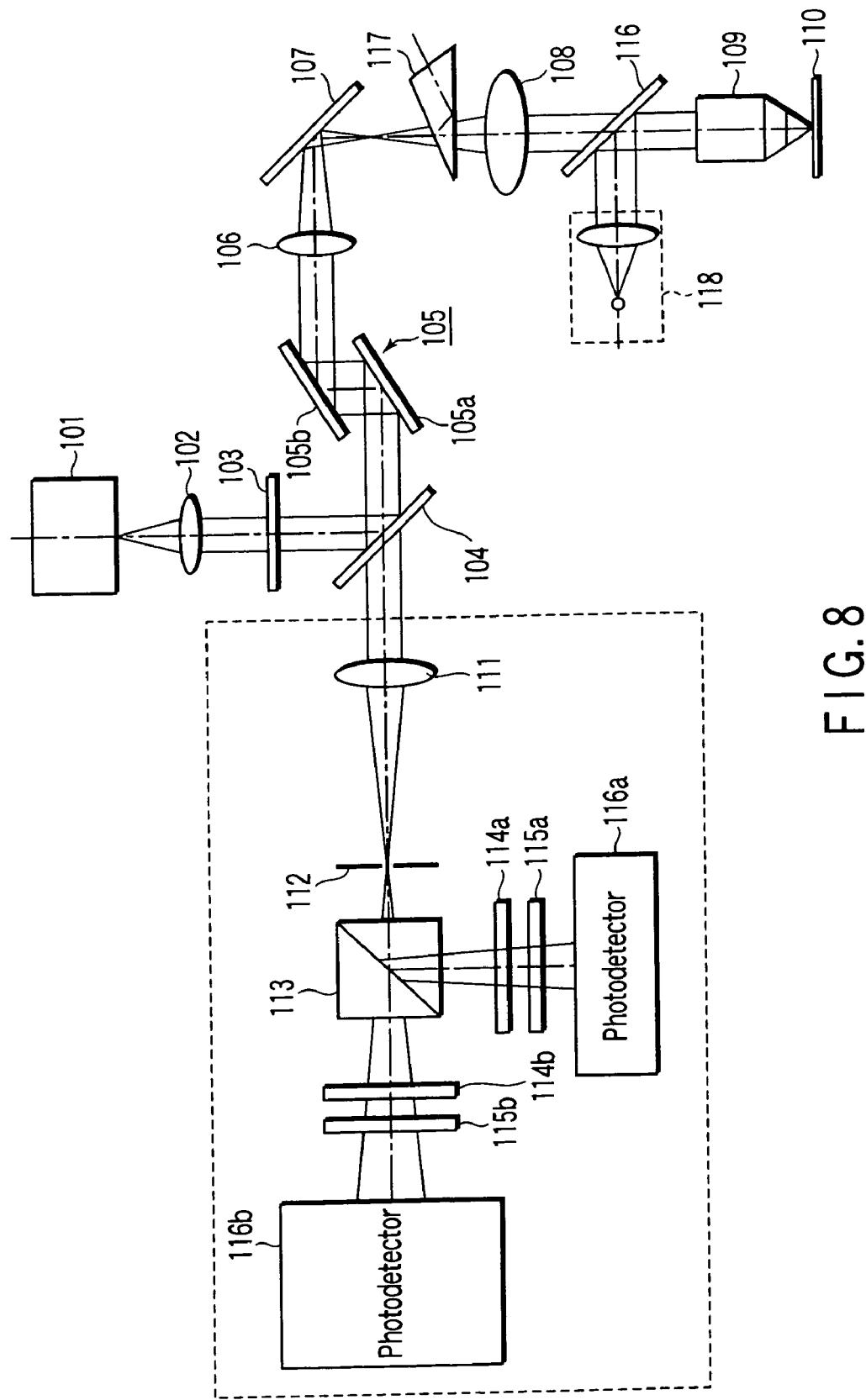
FIG. 8 is a diagram showing the schematic configuration of a fourth embodiment of the present invention.

In the fourth embodiment, the present invention will further concretely be described. FIG. 8 shows the schematic configuration of the confocal laser scanning microscope to which the fourth embodiment is applied.

In FIG. 8, a laser light source 11 generates a pulsed laser beam having the polarized components as an excited light. In this case, a small-sized semiconductor laser in which the laser beam is easily turned on/off is used in the laser light source 101.

A capacitor lens 102, a polarizer 103, and a dichroic mirror 104 are arranged on the optical path of the laser beam from the laser light source 101.

The capacitor lens 102 collimates the excited light from the laser light source 101 in an optimum diameter. The polarizer 103 has properties for improving and optimizing the polarization properties (extinction ratio) of the laser light source 1, and the dichroic mirror 104 has properties for detecting a necessary wavelength band. The dichroic mirror 104 reflects the laser beam incident from the laser light source 101, and transmits (detects) the fluorescence incident on the side of a scanning optical unit 105. It is to be noted that the dichroic mirror 104 is detachably attached so as to change the corresponding properties, when the wavelength of the excited light or the wavelength of the fluorescence emitted from a sample 110 described later is changed if necessary.

A scanning optical unit 105 is disposed in the reflected optical path of the dichroic mirror 104. The scanning optical unit 105 includes scanning mirrors 105a, 105b, and the laser beam is deflected by these scanning mirrors 105a, 105b.

A pupil projection lens 106 and mirror 107 are arranged in the optical path of the laser beam deflected by the scanning optical unit 105. An image formation lens 108 and an objective lens 109 are arranged in the reflected optical path of the mirror 107.

The laser beam reflected by the mirror 107 and passed through the image formation lens 108 is scanned over an entire view field of the objective lens 109 by the movement of the scanning mirrors 105a, 105b.

Also in this case, the fluorescent proteins such as GFP are used as the fluorescent labels in the sample 110. The sample 110 is excited by the laser beam having the polarized components focused in the focal position, and absorbs the light in the polarizing direction in the transition moment of the fluorescent molecules which agrees with the polarizing direction, and is brought into the excited state. In this case, the fluorescence deactivated from the excited state also forms a polarized light which agrees with the transition moment.

Accordingly, the fluorescence (hereinafter referred to as "polarized fluorescence") having the polarized components is generated from the sample 110. The polarized fluorescence is focused on the objective lens 109, passed through the image formation lens 108, and incident upon the dichroic mirror 104 through the mirror 107, pupil projection lens 106, and scanning optical unit 105. The dichroic mirror 104 separates a return light in which the polarized fluorescence is mixed with the excited light, and transmits the polarized fluorescence.

A condensing lens 111 and confocal pinhole 112 are arranged in the transmission optical path of the dichroic mirror 104. The condensing lens 111 forms the polarized fluorescence emitted from one point of the sample 110 into the image on the confocal pinhole 112. The confocal pinhole 112 is disposed in a position optically conjugated with a focal point of the objective lens 109, and transmits focused components in the polarized fluorescence from the sample 110, but cannot transmit non-focused components. In this case, the size of the confocal pinhole 112 needs to be smaller than that of the airy disk formed by the condensing lens 111 in order to sufficiently realize a confocal effect. Therefore, when the objective lens 109 is changed, a mechanism is accordingly preferably disposed in which the size of the pinhole is changed to a different size. Concretely, for example, a disc-shaped turret including a pinhole having a different size may be rotated in synchronization with a revolver (not shown) for use in switching the objective lens 109.

A polarized beam splitter 113 is disposed on the optical path of the light which comes out of the confocal pinhole 112. The polarized beam splitter 113 splits the light passed through the confocal pinhole 112 into two polarized components crossing at right angles to each other, that is, the p-polarized and s-polarized components. In this case, since the type of the fluorescence wavelength is various, a band of the polarized beam splitter 113 is preferably as broad as possible. If possible, the polarized beam splitter is preferably detachably attached in the same manner as in the dichroic mirror 104, so that the characteristics can be changed to the corresponding characteristics, when the wavelength of the fluorescence is changed.

A barrier filter 114a, analyzer 115a, and photodetection unit 116a are arranged as a first detection system in one optical path split by the polarized beam splitter 113, and a barrier filter 114b, analyzer 115b, and photodetection unit 116b are arranged as a second detection system in the other optical path. These two detection systems have substantially equal characteristics.

Here, the barrier filters 114a, 114b completely cut the excited light which cannot completely be cut off by the dichroic mirror 104. That is, in general, when a light emitting efficiency of fluorescence is not very high, and especially when photons are counted by the pulse light excitation, the filters are used. Because an influence of the leak of the laser beam included in the fluorescence over fluorescence measurement is large as compared with another microscope observation. The analyzers 115a, 115b are used to realize correct measurement. Because both the transmitted light and the reflected light have a large ratio (1 to 5%) of mixture of unnecessary polarized components having an opposite direction, when the polarized beam splitter 113 is brought in a broader band. High-sensitivity and low-noise detecting units such as a photomultiplier tube and an avalanche diode are used as the photodetection units 116a, 116b.

It is to be noted that in FIG. 8, the light coming out of the confocal pinhole 112 is drawn so as to spread largely. When a ratio of a focal distance between the condensing lens 111 and the pupil projection lens 106 is increased, and an image formation magnification onto the confocal pinhole 112 is raised, the spread of the light can sufficiently be reduced with respect to the light receiving surfaces of the photodetection units 116a, 116b. Needless to say, when there is a sufficient space, an optical system for projecting the image of the confocal pinhole 112 onto the photodetection units 116a, 116b may also be constituted.

On the other hand, a half mirror 116 is disposed between the image formation lens 108 and the objective lens 109, and an observation lens tube 117 is disposed between the reflective mirror 107 and the image formation lens 108.

An illuminative light from an observation illuminating unit 118 is incident upon the half mirror 116. The illuminative light is reflected by the half mirror 116 to irradiate the sample 110 via the objective lens 109. The reflected light from the sample 110 is transmitted through the half mirror 116, and is incident upon the observation lens tube 117 via the image formation lens 108, so that a sample image can be observed visually or on TV in a general optical microscope.

Next, an operation of the embodiment constituted in this manner will be described.

When the pulsed laser beam is emitted from the laser light source 101, the laser beam is collimated by the collimator lens 102, and the polarization properties are optimized by the polarizer 103. Thereafter, the light is reflected by the dichroic mirror 104 and is incident upon the scanning optical unit 105.

The laser beam incident upon the scanning optical unit 105 is deflected by the scanning mirrors 105a, 105b, and is incident upon the image formation lens 108 via the pupil projection lens 106 and mirror 107. The laser beam transmitted through the image formation lens 108 is condensed on the sample 110.

The sample 110 is brought into the excited state by the polarized laser beam focused in the focal position. In this case, the fluorescence deactivated from the excited state also forms the polarized light which agrees with the transition moment.

The polarized fluorescence emitted from the sample 110 is incident upon the dichroic mirror 104 through the objective lens 109, image formation lens 108, mirror 107, pupil projection lens 106, and scanning optical unit 105 in a direction opposite to that of the previous optical path.

The polarized fluorescence transmitted through the dichroic mirror 104 is formed into the image on the confocal pinhole 112 through the condensing lens 111. The polarized fluorescence passed through the confocal pinhole 112 is separated into two polarized components crossing at right angles to each other, that is, the p-polarized and s-polarized components by the polarized beam splitter 113.

The fluorescence of one polarized component separated by the polarized beam splitter 113 is incident upon the photodetection unit 116a via the barrier filter 114a and analyzer 115a, and the fluorescence of the other polarized component is incident upon the photodetection unit 116b via the barrier filter 114b and analyzer 115b. The photodetection units 116a, 116b detect luminance of the incident fluorescence, converts the fluorescence into an electric signal, and outputs confocal image data.

Moreover, an image of a rotation relaxation time of fluorescence molecules can be obtained in consideration of a ratio or a difference with respect to the polarized components of output signals from the photodetection units 116a, 116b corresponding to the respective scanning points of the sample 110 acquired in this manner. When a sum is calculated, a fluorescent life image can be obtained regardless of presence/absence of molecular rotation. Furthermore, the number of photons is counted with the photodetection units 116a, 116b. When a coefficient of the total number of photons is obtained for each pixel, the fluorescent intensity image can be obtained. In this case, the number of excitation pulses emitted for each pixel has to be the same.

It is to be noted that a detection signal intensity (the number of photons) with respect to the polarized components crossing at right angles to one another in the fourth embodiment sometimes subtly differs with a transmittance of the polarized beam splitter 113, a difference of reflectance, a difference of the transmittance between the barrier filters 114a, 114b, a difference of the transmittance between the analyzers 115a, 115b, and a difference of sensitivity between the photodetection units 116a, 116b. When the above-described calculation is performed, this intensity needs to be incorporated as a correction coefficient to perform the calculation. When the dichroic mirror 104 is replaced with that having appropriate wavelength properties, the polarized beam splitter 113 is replaced with the half mirror, and band pass filters having different wavelength band s are used instead of the analyzers 115a, 115b, the fluorescent intensity image and fluorescent life image having two different wavelengths can simultaneously be obtained.

Therefore, in this manner, a tomogram of a fluorescent intensity distribution by the confocal effect can be acquired by one excited light scanning with respect to the sample 110, and a rotation relaxation time image and fluorescent life image of labeled molecules can be acquired. When a small number of optical components are simply replaced, the difference of properties on the sample by the fluorescence emitting various fluorescent wavelengths can be observed.

When the sample labeled with the fluorescent protein is irradiated with the laser beam having the polarized components as the excited light according to the embodiment of the present invention, the sample can securely be excited. When the fluorescence having the polarized components generated from the sample is detected via the wavelength dividing means, polarization property extracting means, and wavelength selection means, the molecular movement of the protein and the fluorescent life can be analyzed from detected information. Furthermore, when the confocal microscope is combined, information of local polarized fluorescence properties in a cell can also be obtained.

Moreover, according to the embodiment of the present invention, since the polarizing direction of the laser beam can be changed in accordance with the polarizing direction of the sample by polarizing direction changing means, the data of the fluorescence having different polarized components on the sample can selectively be acquired.

Furthermore, since the polarizing direction of the polarizing direction changing means can be controlled by the detected information of each portion on the sample, the information can be displayed in accordance with the polarizing direction of each portion on the sample.

According to the embodiment of the present invention, there can be provided the confocal microscope in which the sample labeled with the fluorescent protein can be excited and various functions of the sample can be analyzed by the polarized fluorescence obtained in this manner.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A confocal microscope comprising:
a light source which emits a polarized light beam;
an optical scanner which deflects and scans the polarized light beam;
an objective lens which irradiates the polarized light beam, which is deflected and scanned by the optical scanner, to a sample as an excitation light beam that excites the sample so as to cause the sample to emit a polarized fluorescence;
a wavelength separator which separates a necessary wavelength band from the polarized fluorescence emitted from the sample; and
two photodetector units, each of which comprises:
a polarization property extractor which extracts a fluorescence with a predetermined polarization property from the fluorescence separated with the wavelength separator;
a wavelength selector which selects a wavelength of the fluorescence extracted by the polarization property extractor; and
a photodetector which detects the fluorescence selected by the wavelength selector;
wherein the two photodetector units respectively detect an s-polarized component and a p-polarized component of the fluorescence emitted from the sample; and
a calculator which calculates a rotation relaxation time and a fluorescence life based on a change of a fluorescence intensity of the s-polarized component and the p-polarized component respectively detected by the two photodetector units over time.

2. The confocal microscope according to claim 1, wherein the light source comprises a polarizing direction changer which changes a polarizing direction of the polarized light beam.

3. The confocal microscope according to claim 2, wherein the polarizing direction changer rotates the entire light source around a light axis of the light beam emitted from the light source.

4. The confocal microscope according to claim 2, further comprising an optical fiber which transmits the polarized light beam emitted from the light source, wherein the polarizing direction changer is provided to the optical fiber.

5. The confocal microscope according to claim 4, wherein the polarizing direction changer comprises a rotation mechanism capable of rotating an output end portion of the optical fiber.

6. The confocal microscope according to claim 2, further comprising a controller which controls the polarizing direction of the polarizing direction changer in accordance with known information of each part of the sample.

7. The confocal microscope according to claim 1, wherein the light source includes a plurality of light sources, and each of the plurality of light sources comprises a polarizing direction changer which changes a polarizing direction of the polarized light beam.

* * * * *